United States Patent [19]

Raidel

[11] 4,400,009

[45] Aug. 23, 1983

[54] STABILIZED AXLE SEAT FOR CANTILEVER MOUNT

[76] Inventor: John E. Raidel, Rte. 9, Box 400-M, Springfield, Mo. 65804

[21] Appl. No.: 270,607

[22] Filed: Jun. 5, 1981

Related U.S. Application Data

[63] Continuation-in-part of Ser. No. 110,778, Jan. 9, 1980, Pat. No. 4,331,348, and Ser. No. 113,472, Jan. 21, 1980, Pat. No. 4,278,271, and Ser. No. 113,710, Jan. 21, 1980, Pat. No. 4,309,045.

[51] Int. Cl.³ .............................................. B60G 5/00
[52] U.S. Cl. ................................. 280/687; 267/63 R; 280/716
[58] Field of Search ............... 280/676, 683, 684, 685, 280/687, 686, 702, 711, 716, 718; 267/63 R, 65 R

[56] References Cited

U.S. PATENT DOCUMENTS

| | | | |
|---|---|---|---|
| 3,494,609 | 2/1970 | Harbers | 280/718 |
| 3,556,554 | 1/1971 | Saward | 267/63 R |
| 3,572,745 | 3/1971 | Willetts | 280/687 |
| 3,687,478 | 8/1972 | Willetts | 280/687 |
| 4,030,738 | 6/1977 | Willetts | 280/683 |
| 4,033,609 | 7/1977 | Malcolm | 280/718 |
| 4,065,153 | 12/1977 | Pringle | 280/718 |
| 4,162,799 | 7/1979 | Willetts | 280/683 |
| 4,191,398 | 3/1980 | Willetts | 280/687 |
| 4,293,145 | 10/1981 | Taylor | 280/711 |

FOREIGN PATENT DOCUMENTS 461583 2/1937 United Kingdom ................ 280/687

*Primary Examiner*—David M. Mitchell
*Assistant Examiner*—John A. Carroll
*Attorney, Agent, or Firm*—Rogers, Eilers & Howell

[57] ABSTRACT

A stabilized axle seat for mounting a suspension in cantilever fashion from an axle for a nonpowered vehicle prevents axle windup as the brakes are applied and yet permits limited oscillation of the axle to follow the varying contour of the road. The stabilized axle seat includes two spaced apart axle brackets, each bracket having an ear extending along the side of the torque rod to provide a location at which a bushing may extend through the torque rod and to each axle bracket. A main bushing directly below the axle and connecting the end of the torque rod to the axle brackets provides a second location at which the axle brackets are pivotally mounted to the torque rod. Each of the spaced apart bushings has an elastomeric member which permits limited oscillation of the axle seat and axle to more closely follow the varying contour of the road and provide a smoother and safer ride.

16 Claims, 4 Drawing Figures

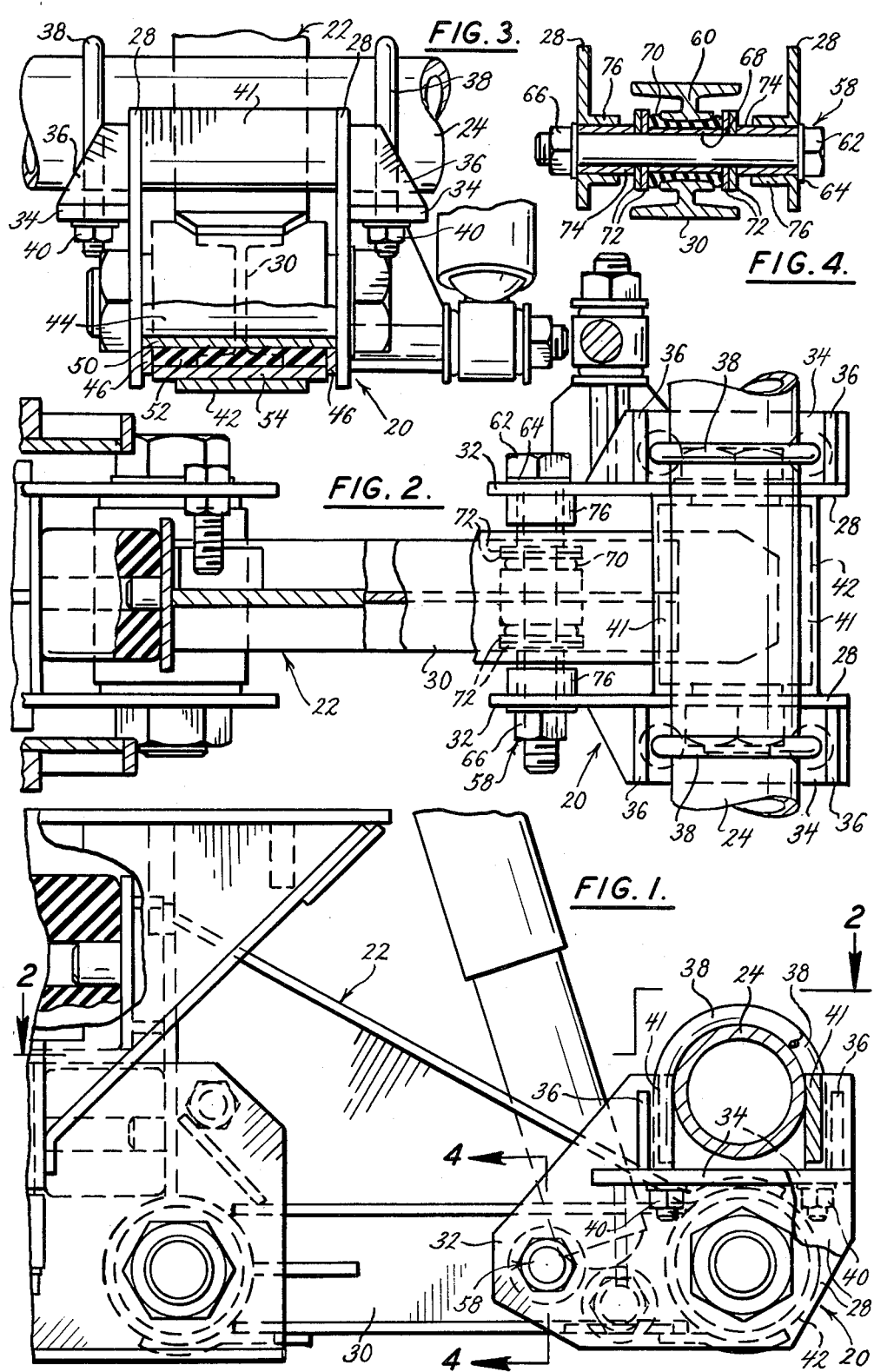

STABILIZED AXLE SEAT FOR CANTILEVER MOUNT

BACKGROUND AND SUMMARY OF THE INVENTION

This application is a continuation-in-part of Ser. No. 110,778, filed Jan. 9, 1980, now U.S. Pat. No. 4,331,348, and Ser. No. 113,472, filed Jan. 21, 1980, now U.S. Pat. No. 4,278,271 and Ser. No. 113,710, filed Jan. 21, 1980 now U.S. Pat. No. 4,309,045; the disclosures of which are incorporated herein by reference.

In vehicles supported by axles and wheels with brakes, when the brakes are applied, the axle wants to become part of the wheel and rotate with it. Of course, this is undesirable and it is common practice in the art to somehow stabilize the axle to prevent this rotation in either direction. However, the axle should also be permitted some limited range of movement to allow the wheels and tires to closely follow the varying contour of the road that the vehicle traverses. There must be some balancing and trade off between these two requirements in a good design to result in a safe and smooth ride. Applicant has invented many suspensions, some of which are disclosed and claimed in the parent applications mentioned above, which utilize various kinds of arrangements to stabilize an axle and prevent its following the wheel upon brake application, while permitting limited oscillation thereof to enhance wheel and tire tracking over uneven roads with holes and bumps.

In U.S. Ser. No. 110,778, applicant discloses and claims a suspension system for a heavy-duty, over the road type truck vehicle, including a novel pivoting axle seat for mounting the suspension between a pair of axles in cantilever fashion. The pivoting movement of the axle seat applies a moment to a member of the axle seat upon axle loading, which in turn applies a force to the load springs proportional to and in opposition to the loading force. Each axle seat is pivotally mounted to a torque rod at a point offset from the center line of the axle. This permits the pivoting action of the axle seat, which creates the moment. Thus, this application discloses an axle seat which is pivotally mounted by a single bushing to a torque rod, the torque rod extending in cantilever fashion from the rest of the suspension.

Another example of a suspension which is mounted between axles in cantilever fashion is disclosed and claimed by applicant in U.S. Ser. No. 113,472. In the suspension disclosed therein, each axle has an axle seat which is pivotally mounted by a single bushing to a torque rod, with a central torque rod mounted to the top of the axle housing and extending to the frame to complete a parallelogram for stabilizing the axle. Thus, as the axle moves up and down with respect to the chassis, and the load is balanced through the suspension by action of the compensator and central elastomer spring, the pitch of the axles remains constant. This same type of suspension is shown in this application for purposes of illustrating applicant's new stabilized axle seat.

Spaced bushings have been previously disclosed by applicant in U.S. Ser. No. 113,710 as a means for stabilizing a pair of beams while permitting limited oscillation about the longitudinal axis of the vehicle. However, as shown in that disclosure, each of the beams is separately secured to the chassis or spring at another point on the beam, and the axle is separately stabilized and controlled through the parallelogram arrangement of the connected beams and a torque rod mounted at the center of the axle housing and extending to the frame. Thus, this suspension surrounds the axle, much unlike a cantilever suspension, and a parallelogram arrangement of torque rods is used to stabilize the axle. As further noted in that disclosure, applicant is the inventor of U.S. Pat. No. 3,801,086, which discloses still another use of spaced resilient bushings to help stabilize a pair of beams in which each beam is attached to either the chassis or a spring at another point along its length. In that patent, the axle is fixedly mounted to one of the beams and is surrounded by the suspension.

As can be appreciated, it can be quite difficult to achieve proper axle stabilization in a suspension which mounts between a pair of axles and a chassis in cantilever fashion. This is especially true in a suspension which provides the added advantage of being able to shift an unbalanced loading from one axle to the other, as the suspension must be free to adjust its position between the axles and chassis, as required. In applicant's center spring suspension with cantilever mount disclosed in Ser. No. 113,472, a separate torque arm was provided between each axle housing and chassis for both axles to achieve this stabilization. As an improvement thereon, applicant has succeeded in developing the stabilized axle seat of the present invention for light duty, non-powered vehicle axles, which provides many advantages. The central torque arms are not required to be used with applicant's light duty stabilized axle seat, thus eliminating material and installation time for these separate pieces of hardware. Furthermore, the stabilized axle seats are integral with the torque rod extensions of the suspension and are automatically connected as the axle is clamped in place. This eases installation as it requires no additional effort to install, as the axles must always be secured to the suspension. With the spaced bushings having elastomeric members, each axle is permitted a limited amount of oscillation about the longitudinal axis of the vehicle at each end thereof. These and other advantages of applicant's invention may be more fully appreciated by referring to the drawings and the description of the preferred embodiment which follows.

DESCRIPTION OF THE DRAWINGS

FIG. 1 is a fragmentary side view of the suspension of U.S. Ser. No. 113,472, except with applicant's stabilized axle bracket;

FIG. 2 is a top view taken along the plane of line 2—2 in FIG. 1;

FIG. 3 is an end view partially broken away to detail one of the bushings; and

FIG. 4 is a cross sectional view taken along the plane of line 4—4 in FIG. 1 which details the second bushing.

DETAILED DESCRIPTION OF THE PREFERRED EMBODIMENT

Applicant's stabilized axle seat 20 is shown in FIG. 1 to mount the vehicle suspension 22 in cantilever fashion from each of a fore axle (not shown) and an aft axle 24. Although only one vehicle suspension 22 is shown, it is to be understood that the other side of the vehicle has a similar suspension 22. Furthermore, applicant will describe in greater detail only one of the stabilized axle seats 20 shown in FIG. 1, and it is to be understood that the other axle seats 20 are of similar construction.

Applicant's stabilized axle seat 20 includes a pair of axle brackets 28, which extend generally fore and aft and straddle the torque rod 30. Each of these axle brackets 28 has an ear 32 portion which extends closest towards the suspension 22. Cross brackets 41 extend between brackets 28 and support them in a spaced apart manner, as shown in FIG. 3. Mounting brackets 34 extend perpendicularly to the axle brackets 28 and have strengthening webs 36. A pair of U-bolts 38 and associated nuts 40 mount the axle 24 to the axle seat 20.

A first main bushing 42 is directly beneath the center line of the axle 24 and mounts the outer end of torque rod 30 between the axle brackets 28. As shown in partial cross section in FIG. 3, each main bushing 42 has a central bolt 44, washers 46 and nut 48 extending between and connecting axle brackets 28. An inner sleeve 50 surrounds the shank of bolt 44, with elastomeric member 52 disposed between inner sleeve 50 and an outer sleeve 54 formed at the end of torque rod 30. One or more spacer washers 46, as shown may be used to provide adjustment.

A second, somewhat smaller, stabilizer bushing 58 is shown in greater cross sectional detail in FIG. 4, and extends between the axle brackets 28 and the center web 60 of torque rod 30. A central bolt 62 with washer 64 and nut 66 form the axis of the bushing 58. A central sleeve 68 extends through the center web 60 with an elastomeric grommet 70 positioned between the central sleeve 68 and the center web 60. A pair of spacer washers 72 are disposed on each side of the elastomeric grommet 70 with a spacer sleeve 74 and shoulder 76 reinforcing the shank of center bolt 62.

Thus, each axle is clamped to an axle seat which in turn is pivotally secured at each of two spaced apart positions to the torque arm, with an elastomeric member at each bushing to permit limited oscillation of the axle and axle seat about the longitudinal axis of the vehicle and also to limit the pivoting movement of the axle with respect to the outer end of the torque rod. This pivoting movement would otherwise take place as the brakes are applied, the axle wanting to move in concert with the wheel. Although applicant's axle seat has been designed for and works well in light duty applications for non-powered vehicles, it could easily be modified for other applications and stay within the scope and teaching of the invention.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. In a vehicle suspension assembly for mounting a vehicle chassis to at least one vehicle axle, said suspension including at least one pivotally connected torque rod and a load bearing spring element longitudinally displaced from the axle, the suspension being mounted in cantilever fashion to at least one axle at the other end of said torque rod, the improvement comprising an axle seat rigidly secured to each cantilevered axle, and means connecting each axle seat to its associated torque rod to limit pivotal movement of the axle about its torque rod while permitting limited oscillation about the longitudinal axis of the vehicle, said connecting means comprising a plurality of spaced bushings.

2. The device of claim 1 wherein each axle seat includes at least one axle bracket, each of said axle brackets having an ear, one of said bushings extending between said ear and its associated torque rod at a point spaced apart from the end of the torque rod.

3. The device of claim 2 wherein at least one bushing at each axle has an elastomeric member.

4. The device of claim 1 wherein the vehicle has two axles, said suspension being mounted in cantilever fashion from each of said axles.

5. In a vehicle suspension assembly for mounting a vehicle chassis to at least one vehicle axle, the load bearing spring element of said suspension being longitudinally displaced from the axle, the suspension being thereby mounted to the axle in cantilever fashion, an axle seat rigidly secured to the axle, the suspension including at least one torque rod, one end of said torque rod being pivotally connected to the suspension, and at least two spaced apart bushings mounting the axle seat from the other end of the torque rod, said bushings thereby stabilizing the axle and limiting its pivotal movement about the suspension while permitting limited oscillation therebetween.

6. The device of claim 5 wherein the rigid mounting means comprises a plurality of U-bolts to clamp the axle seat to the axle.

7. The device of claim 5 wherein each bushing has an elastomeric member.

8. The device of claim 5 wherein the axle seat includes at least one axle bracket, the bushings extending between the torque rod and said axle bracket.

9. The device of claim 8 wherein each of the bushings has an elastomeric member.

10. The device of claim 8 wherein each axle bracket has an ear extending towards the torque rod, said ear at least partially surrounding a portion of the torque rod so that at least one bushing can extend therebetween at a point spaced apart from the axle.

11. The device of claim 5 wherein the vehicle has a second axle, the suspension and spring element being generally disposed between said axles and mounted to each in cantilever fashion, a second axle seat rigidly secured to the second axle, the suspension including a second torque rod, one end of said second torque rod being pivotally connected to the suspension, and at least two spaced apart bushings mounting the second axle seat from the other end of said second torque rod, said bushings thereby stabilizing said second axle and limiting its pivotal movement about the suspension while permitting limited oscillation therebetween.

12. The device of claim 5 wherein one of said spaced bushings is substantially aligned with the vertical centerline of the axle, and the other of said spaced bushings is spaced apart therefrom but generally along the same horizontal centerline of said first spaced bushing.

13. The device of claim 5 wherein the axle seat comprises a pair of axle brackets, said axle brackets having ear portions extending longitudinally along opposite sides of the torque arm, one of said spaced bushings being mounted between said ear portions with its medial portion connected to the torque arm.

14. The device of claim 13 wherein an elastomeric member is contained in said bushing and disposed between said torque arm and said medial portion thereof.

15. In vehicle suspension assembly for mounting a vehicle chassis from a pair of spaced axles, the suspension including a load bearing spring element generally disposed between the axles and mounted therebetween in cantilever fashion, an axle bracket rigidly secured to each axle, the suspension including a pair of torque rods, one end of each torque rod being pivotally connected to the suspension, and at least two spaced apart bushings mounting each axle seat from the other end of each torque rod, said bushings thereby stabilizing each axle and limiting its pivotal movement about the suspension while permitting limited oscillation of each axle with respect to the suspension.

16. The device of claim 15 wherein one of said spaced bushings at each axle is substantially aligned with the vertical centerline of the axle, and another of said spaced bushings at each axle is spaced apart therefrom.

* * * * *